(12) United States Patent
Specht et al.

(10) Patent No.: US 6,382,674 B1
(45) Date of Patent: May 7, 2002

(54) APPARATUS FOR TENSIONING A SEATBELT

(75) Inventors: Martin Specht, Feldafing; Walter Krauss, Germering, both of (DE)

(73) Assignee: Breed Automotive Technology, Inc., Lakeland, FL (US)

(*) Notice: Subject to any disclaimer, the term of this patent is extended or adjusted under 35 U.S.C. 154(b) by 0 days.

(21) Appl. No.: 09/642,435

(22) Filed: Aug. 21, 2000

(30) Foreign Application Priority Data

Dec. 16, 1999 (DE) .......................... 199 60 848

(51) Int. Cl.⁷ .......................... B60R 22/36; A47C 31/00
(52) U.S. Cl. .......................... 280/806; 297/480
(58) Field of Search .............................. 280/806, 801.1, 280/805; 297/480

(56) References Cited

U.S. PATENT DOCUMENTS

| | | | | |
|---|---|---|---|---|
| 4,917,210 A | * | 4/1990 | Danicek et al. | 280/806 |
| 5,364,129 A | | 11/1994 | Collins et al. | 280/806 |
| 5,423,598 A | | 6/1995 | Lane, Jr. et al. | 297/479 |
| 5,492,368 A | * | 2/1996 | Pywell et al. | 280/806 |
| 5,564,748 A | * | 10/1996 | Kmiec et al. | 280/806 |
| 5,588,677 A | | 12/1996 | Kopetzky et al. | 280/806 |
| 5,607,185 A | * | 3/1997 | Isaji et al. | 280/806 |
| 5,639,120 A | * | 6/1997 | Kmiec et al. | 280/806 |
| 5,676,397 A | * | 10/1997 | Bauer | 280/806 |
| 5,704,638 A | | 1/1998 | Lane, Jr. | 280/730.2 |
| 5,725,249 A | | 3/1998 | Nishide et al. | 280/806 |
| 5,887,897 A | | 3/1999 | Gill et al. | 280/806 |
| 5,944,350 A | | 8/1999 | Grabowski et al. | 280/806 |
| 5,971,491 A | | 10/1999 | Fourrey et al. | 297/476 |
| 6,039,353 A | | 3/2000 | Bauer et al. | 280/806 |
| 6,076,856 A | * | 6/2000 | Wang et al. | 280/806 |
| 6,199,954 B1 | * | 3/2001 | Holzapfel | 297/479 |

FOREIGN PATENT DOCUMENTS

| | | |
|---|---|---|
| DE | 19629263 | 2/1997 |
| DE | 4332206 | 8/1997 |
| EP | 0685371 | 4/1995 |

* cited by examiner

Primary Examiner—Anne Marie Boehler
Assistant Examiner—Joselynn Sliteris
(74) Attorney, Agent, or Firm—Lonnie Drayer; Jarrett Rieger

(57) ABSTRACT

An apparatus for tensioning a seatbelt has a piston that is driven in a guide tube and is connected to the belt webbing of the seatbelt via a traction cable and with a cable guide for the traction cable. The traction cable acts on one end of the belt webbing of the seatbelt and is looped around the cable guide 180°. The portion of traction cable extending between the cable guide and the belt webbing is guided substantially parallel to the axial direction of the guide tube.

6 Claims, 4 Drawing Sheets

APPARATUS FOR TENSIONING A SEATBELT

FIELD OF THE INVENTION

The invention relates to an apparatus for tensioning a seatbelt.

DISCUSSION OF THE PRIOR ART

In a known apparatus for tensioning a seatbelt, taught for example in EP 0 685 371 B1, the tensioner drive consists of a guide tube and a piston driven therein. The piston is connected to a traction cable that is connected via a cable guide to a seatbelt buckle. When the piston is driven linearly through the guide tube, for example by an ignited pyrotechnic propellant, the safety belt buckle is retracted and the belt webbing of the seatbelt is tensioned on a vehicle occupant's body.

SUMMARY OF THE INVENTION

A traction cable is connected to the belt webbing and is looped round the cable guide by about 180°. The portion of traction cable extending between the cable guide and the belt webbing is guided substantially parallel to the axial direction of the guide tube, i.e. parallel to the driving direction of the piston connected to the traction cable. The traction cable, in the region of the webbing end of the pelvic belt is able to act on the belt webbing of the seatbelt, for example by means of a loop, eyelet or the like. The traction cable can also be rigidly connected to the webbing end of the pelvic belt. The belt webbing is guided round a webbing guide so that, when tensioned, it is pulled substantially parallel to the guide tube in the opposite direction to the driven piston. The cable guide is arranged at one end of the guide tube and the webbing guide at the other end of the guide tube.

Preferably, the invention allows tensioning of the seatbelt webbing at the anchor and therefore direct tensioning of the pelvic belt. The benefit of tensioning of the pelvic belt is to keep the vehicle occupant from bouncing around during a collision. The tensioning apparatus is integrated into the seatbelt anchor, which is anchored on the vehicle body, for example on the sill of the vehicle or on the vehicle seat. The piston/cylinder arrangement of the tensioner drive, the cable guide, and the webbing guide preferably form a force absorbing unit. Preferably the guide tube and the two guides are rigidly connected to one another for this purpose. The individual components can also be fastened on a load-carrying frame or housing. The vertical axes of the guide axes preferably extend substantially parallel to one another. The unit simultaneously forms the end fitting or the anchor for the pelvic belt on the vehicle body, this anchor on the vehicle body preferably being provided on the sill of the motor vehicle. The anchor can also be arranged in a stationary manner on the seat substructure.

To achieve a compact arrangement of the belt webbing which is moved along the guide tube during tensioning, a shaping device, for example in the form of a metal guide plate can be provided, by means of which the belt webbing is shaped to the contours of the external surface of the guide tube during the tensioning operation.

Advantageously the belt webbing can be sewn to the traction cable in the region of the connection in such a way that its shape is adapted to the shape of the external surface of the guide tube.

BRIEF DESCRIPTION OF THE DRAWINGS

The invention will be described in more detail by means of an embodiment with reference to the figures in which.

DETAILED DESCRIPTION OF THE INVENTION

Figure 1:
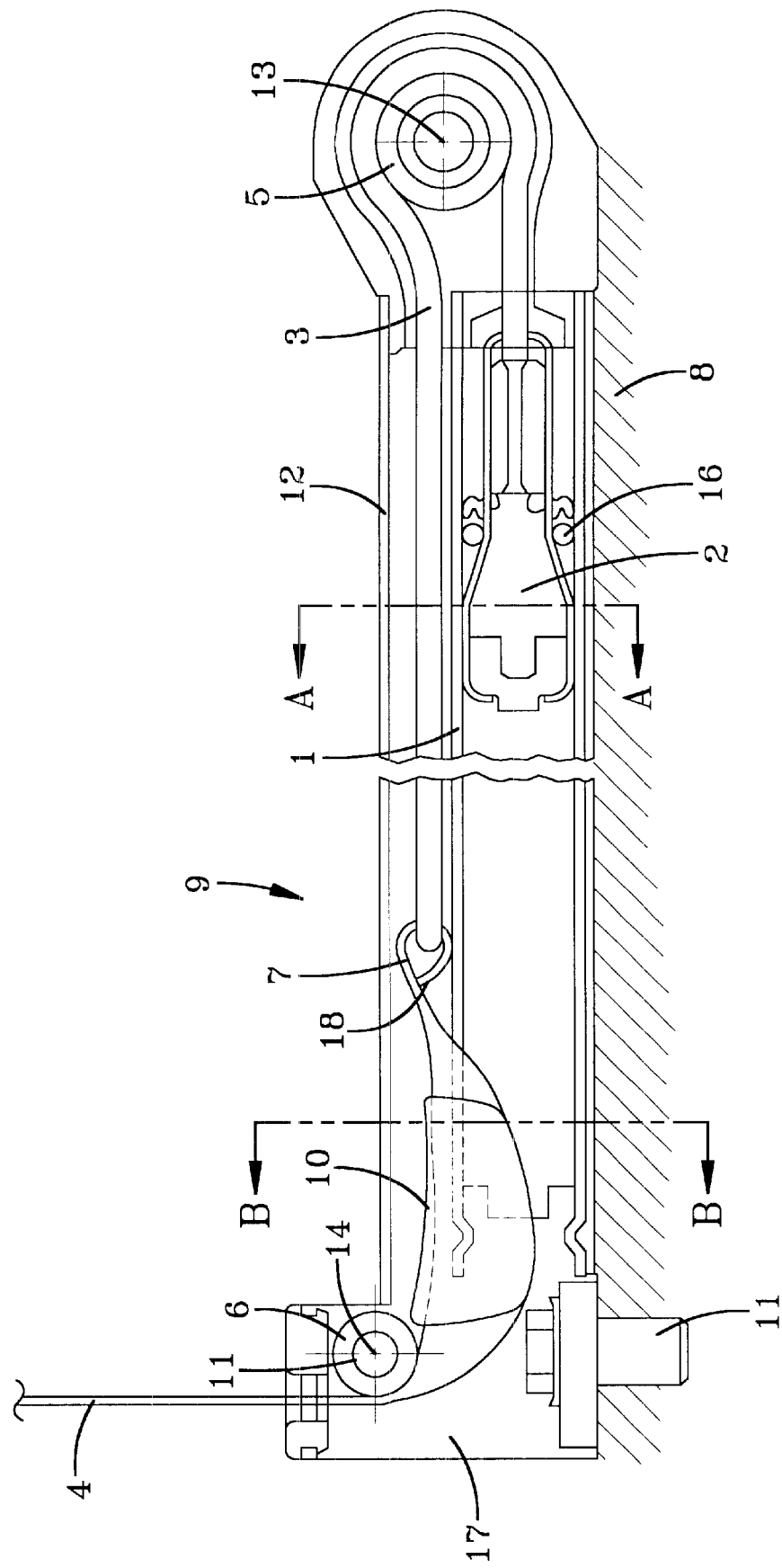
FIG. 1 is a longitudinal section through an embodiment of the invention.

The embodiment in FIG. 1 comprises a guide tube 1 in which a piston 2 is linearly guided in a longitudinal direction. A traction cable 3, guided by about 180° around a cable guide 5, is connected to the piston 2. The end of the traction cable 3 is connected to a webbing end 7 of a belt webbing 4 of a seatbelt, in particular a three-point seatbelt. The portion of the traction cable extending between the belt webbing end 7 and the cable guide 5 is guided substantially parallel to the longitudinal direction of the guide tube 1 and therefore to the driving direction of the piston 2. The portion of the traction cable 3 extending parallel to the guide tube 1 is located between the exterior of the guide tube 1 and the interior of a frame or housing 12 in an intermediate guide space. The cable guide 5 is located at one end of the guide tube 1 or of the frame or housing 12. A webbing guide 6 located on the other end of the guide tube 1 changes the direction of the seatbelt webbing 4 about 90°. The webbing guide 6 can be designed as a roller or a bolt. The cable and webbing guides 5 and 6 and the frame or housing 12 form a load-carrying assembly or a load-carrying unit 9 with the guide tube 1 fastened on the frame. This load-carrying unit 9 can preferably also be formed by the cable and webbing guides 5 and 6 and the guide tube 1. The load-carrying unit 9 can be fastened at least at one fastening point 11 on the sill 8 of a motor vehicle. The illustrated fastening point 11 is located outside the webbing guide 6. Preferably, however, the fastening point 11 can be provided on the webbing guide axis 14 so that the belt webbing is guided around the fastening point. The load-carrying unit 9 forms the end fitting fastening of the belt webbing of the seatbelt, in particular of the end of the pelvic belt on the vehicle body, preferably in the region of the vehicle sill or actually on the vehicle sill.

However, it is also possible to fasten the belt webbing 4 in the conventional manner via an end fitting on the vehicle body and to surround the belt webbing which is to be tensioned with an engagement loop or engagement eyelet on the end of the traction cable. A block and tackle effect is achieved in this way, but the traction cable 3 can also be arranged as a block and tackle.

Figure 2:
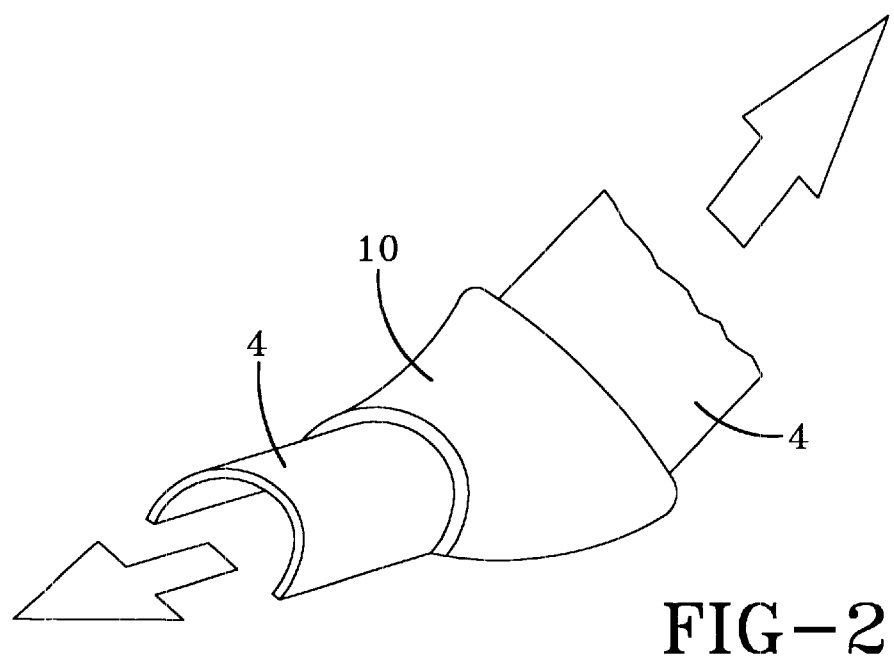
FIG. 2 is a perspective view of an embodiment of a shaping device for the webbing.
Figure 3A:
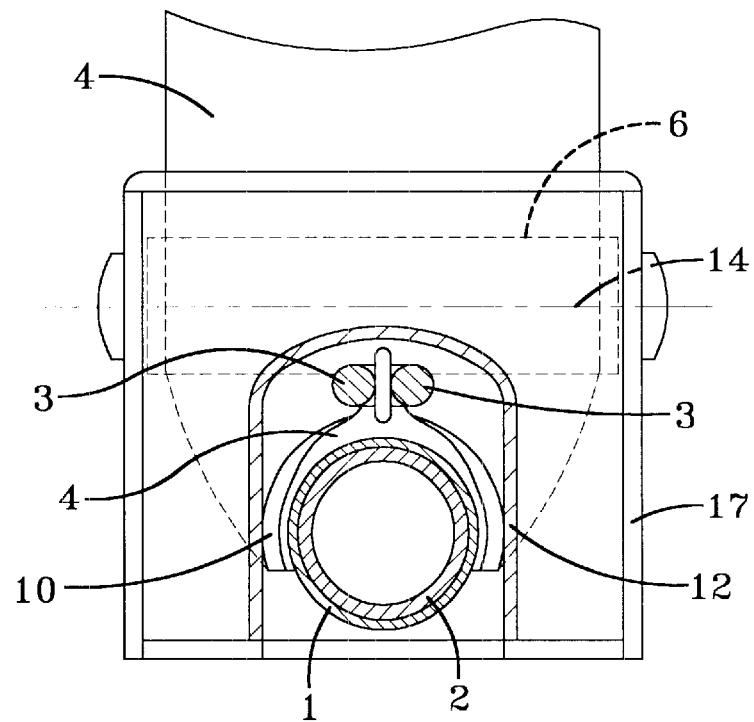
FIG. 3A is a sectional view along section line A—A in FIG. 1.
Figure 3B:
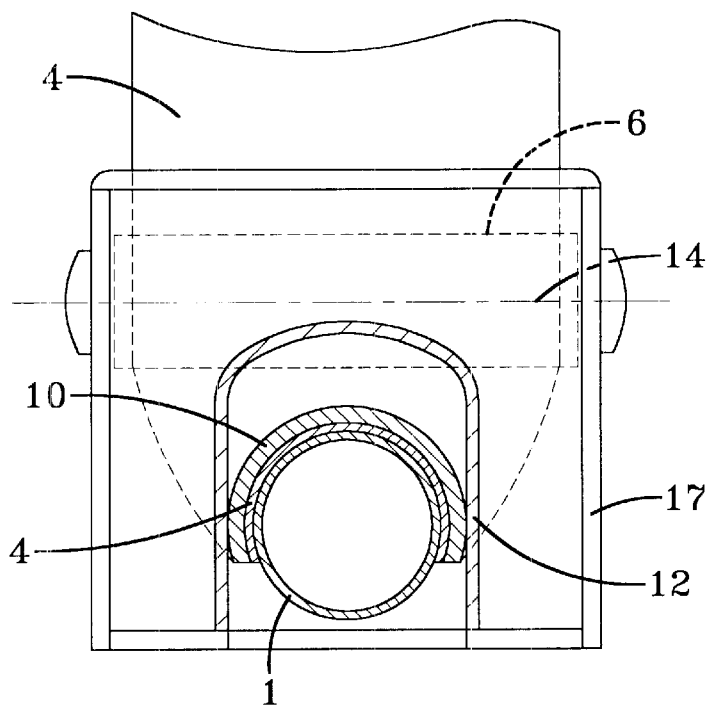
FIG. 3B is a sectional view along section line B—B in FIG. 1.

A shaping device 10, which is shown in perspective in FIG. 2, is provided directly downstream of the webbing guide 6 in the tightening direction. Owing to this shaping device 10 which can be designed as a shaping metal plate, the belt webbing is applied to the outer periphery of the guide tube 1 during tensioning of the seatbelt, as shown in FIGS. 3A and 3B. A compact arrangement of the tensioned belt webbing which is retracted into the load-carrying unit 9 or the frame (housing) 12 is thus obtained. During tensioning of the belt webbing 4, webbing is pulled opposite the direction of movement of the piston 2. A pyrotechnic propellant can be provided in the piston 2 for driving the piston. However, it is also possible to provide the pyrotechnic propellant in the guide tube 1. Clamping members 16 which stop reverse movement of the guide tube can be arranged on the piston 2 in a known manner.

Known configurations of linear tensioner drives which can be used are known, for example, from EP 0 685 371 B1 or DE 43 32 206 C2.

Figure 5:
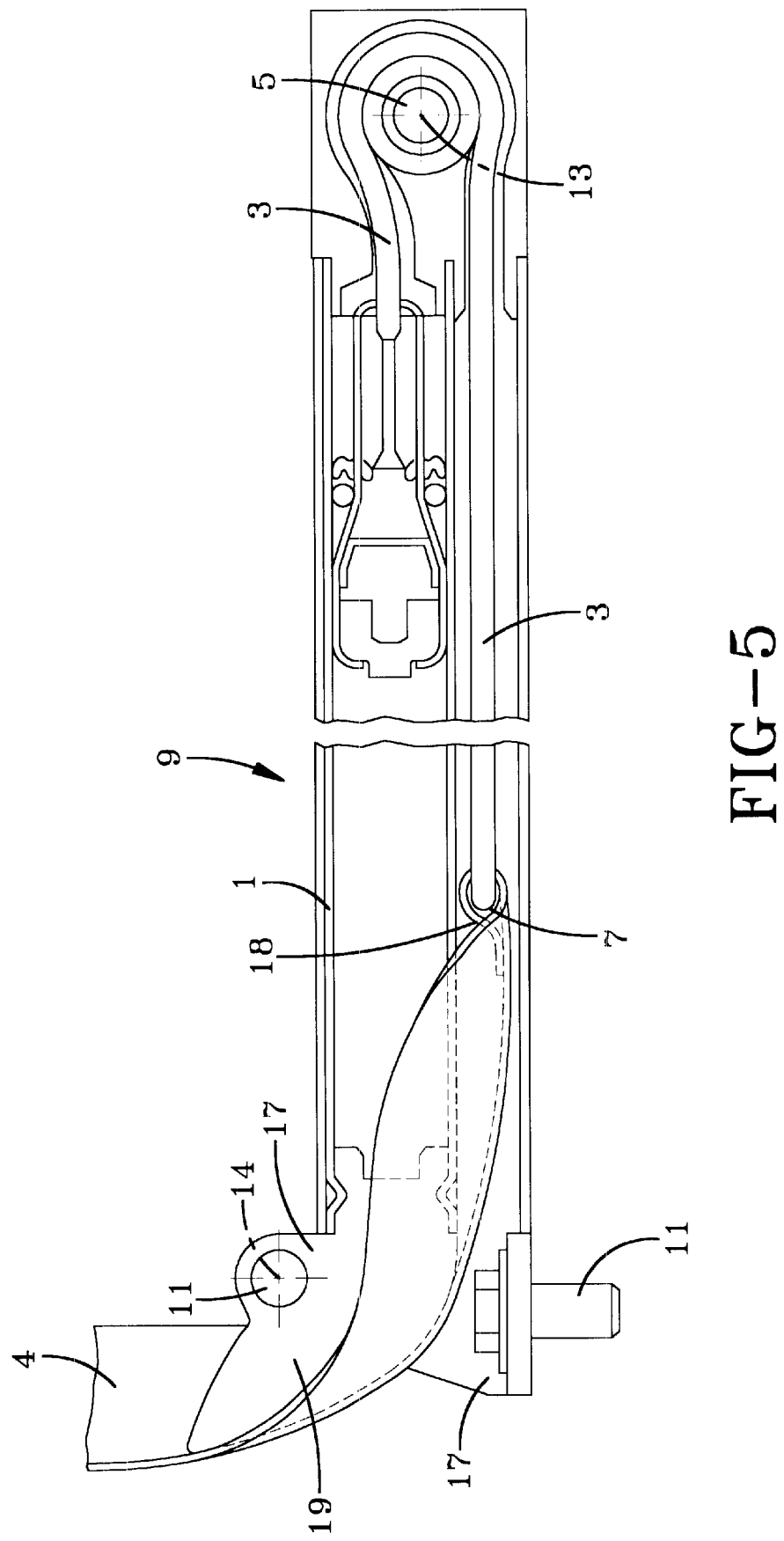
FIG. 5 shows a longitudinal section through a further embodiment of the invention.

In the embodiment shown in FIG. 5, the webbing guide 19 for the belt webbing is a metal plate. The belt webbing 4 is guided through this webbing guide 19 past the end of the guide tube 1. The webbing guide 19 can be connected by an interlocking or friction fit to the end of the guide tube. The belt webbing 4 is guided along a rounded slope on the back of the guide tube 1 by the webbing guide 19. During the tensioning of the belt webbing 4, the webbing is therefore pulled onto the external surface of the guide tube 1 which is turned away from the side on which the pelvic belt of the seatbelt is located.

In the embodiments shown in FIGS. 1 and 5, the connecting point 18 of the belt webbing which is placed through a loop provided in the traction cable at the connecting point 18 to the traction cable 3 and is sewn with a seam, can be shaped in such a way that adaptation to the external surface, in particular to the peripheral shape of the guide tube 1 is achieved. Pre-shaping of the belt webbing is thus formed, by means of which the guidance of the belt webbing with adaptation in shape to the external surface of the guide tube is assisted or ensured during tensioning. Compact accommodation of the webbing is achieved in conjunction with the rounded slope formed on the webbing guide 19.

As shown in FIGS. 1 and 5, the webbing guide 6 or 19 for the belt webbing 4 and the fastening point 11 can be arranged in such a way that a connecting line between them extends roughly in the direction of the forces acting on the belt webbing, in particular the forces which occur in the event of an accident. The webbing guide 6 or 19 as well as the fastening point 11 are arranged at one end of the load-carrying unit 9 and the cable guide 5 for the traction cable 3 at the other end of the load-carrying unit 9. The forces acting in the opposite direction at the cable and webbing guides 5 and 6 (or 19) during the tightening process are therefore absorbed by the load-carrying unit 9. The forces acting in the longitudinal direction of the belt webbing 4 guided to the pelvic belt are conveyed via the load-carrying unit 9 and through the fastening point 11 by , for example, an anchoring screw, into the vehicle body, in particular the vehicle sill 8. This is also the case with the arrangement of the fastening point in the webbing guide axis 14 of the webbing guide 6 or 19.

Preferably, the webbing and cable guides 5 and 6 (or 19) are supported, in particular with an interlocking or frictional connection to the guide tube 1 so that forces acting on the cable and webbing guides 5 and 6 (or 19) are absorbed by the guide tube 1 and conveyed via the fastening point 11 into the vehicle body or vehicle sill 8.

An anchoring screw passing through the anchoring point 11 is inserted into a fastening orifice in a fastening piece 17. The webbing guide 6 is also preferably mounted on this fastening piece 17. The fastening piece 17 in turn is supported at the end of the guide tube 1 located at the opposite end of the guide tube 1 from the cable guide 5. With this embodiment, the frame or the housing 12 can consist, for example, of a plastic material since the forces acting on the cable and webbing guides 5 and 6 (or 19) are absorbed by the guide tube 1 anchored at the fastening point 11.

Figure 4:
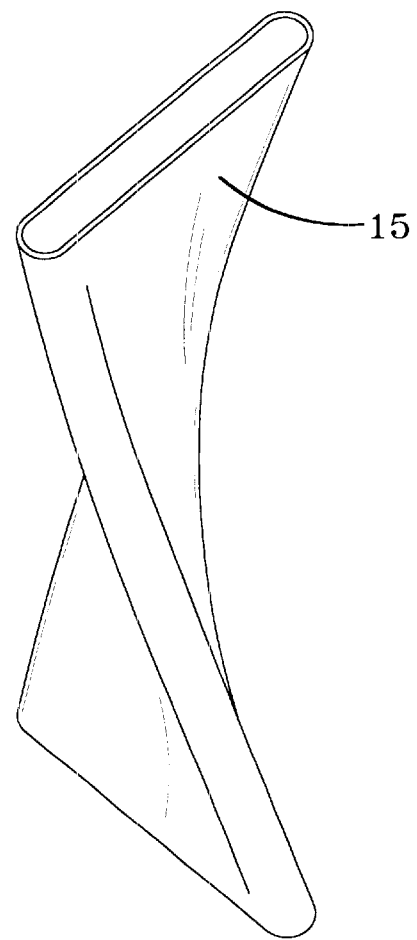
FIG. 4 shows an embodiment of a twisting device for twisting the belt webbing through about 90° around its longitudinal axis.

If the belt webbing 4 is a component of the pelvic belt, a twisting device 15 (FIG. 4) is preferably provided above the guide 6. The belt webbing 4 is thus rotated through 90° around its longitudinal axis. The belt webbing is thus brought into the appropriate position for the pelvic belt for fastening around the vehicle occupant in his pelvic region. In the embodiment shown in FIG. 4, the twisting device 15 can have the form of a sleeve which is adapted to the shape of the belt webbing 4. The belt webbing 4 is guided through the sleeve-shaped twisting device 15 (spiral sleeve). The belt webbing 4 is invariably held in a normal fastening position by being twisted through 90° around the longitudinal axis of the belt webbing 4. During the tightening process, for example during an accident, the belt webbing is directed around the webbing guides 6 or 19. The belt webbing is guided along the external surface of the guide tube 1 in the opposite direction from the driving direction of the piston 2. The axes 13 and 14 of the cable and webbing guides 5 and 6 (or 19) extend parallel to one another and perpendicularly to the longitudinal extent of the guide tube 1.

Many changes and modifications in the above described embodiment of the invention can, of course, be carried out without departing from the scope thereof. Accordingly, that scope is intended to be limited only by the scope of the appended claims.

We claim:

1. An apparatus for tensioning a seatbelt comprising:

(a) a piston that is located in a guide tube and can be driven in the guide tube and that is connected via a traction cable to a belt webbing of the seatbelt;

(b) a cable guide arranged at one end of the guide tube, the traction cable being guided around the cable guide by 180°;

(c) a webbing guide, around which the belt webbing connected to the traction cable is guided, is provided at the other end of the guide tube, a portion of traction cable extending between the cable guide and the belt webbing guide is guided substantially parallel to the axial direction of the guide tube, the belt webbing being adapted to the shape of the external surface of the guide tube when the traction cable pulls the belt webbing towards the cable guide; and (d) a fastening point fastening the apparatus to a vehicle body, said fastening point being provided on the webbing guide.

2. The apparatus according to claim 1 wherein the traction cable is rigidly connected to an end of a pelvic belt of a three-point seatbelt.

3. The apparatus according to claim 2 wherein the belt webbing extending from the webbing guide to the pelvic belt is guided through a twisting device that twists the belt webbing through about 90° around a longitudinal axis of the belt webbing.

4. The apparatus according to claim 2 wherein the portion of the traction cable located outside the guide tube is arranged on a side of the external surface of the guide tube located opposite to the pelvic belt.

5. The apparatus according to claim 1 wherein the belt webbing is guided around the webbing guide.

6. The apparatus according to claim 1 wherein the webbing guide and the cable guide have vertical axes that extend parallel to one another and perpendicularly to the axial direction of the guide tube.

* * * * *